United States Patent [19]

by Makowski, deceased et al.

[11] 4,425,460
[45] * Jan. 10, 1984

[54] AMINE TERMINATED POLYALKYLENE OXIDE NEUTRALIZED SULFONATED THERMOPLASTIC POLYMERS

[75] Inventors: Henry S. by Makowski, deceased, late of Scotch Plains, N.J., by Patricia Helen Makowski, executrix; Robert D. Lundberg, Bridgewater; Pawan K. Agarwal, Westfield, both of N.J.

[73] Assignee: Exxon Research and Engineering Co., Florham Park, N.J.

[ * ] Notice: The portion of the term of this patent subsequent to Aug. 25, 1998 has been disclaimed.

[21] Appl. No.: 264,021

[22] Filed: May 15, 1981

[51] Int. Cl.$^3$ ............................ C08F 8/30; C08F 8/36

[52] U.S. Cl. ............................... 525/380; 525/333.5; 525/344

[58] Field of Search ......................................... 525/380

[56] References Cited

U.S. PATENT DOCUMENTS 4,285,851  8/1981  Makowski .......................... 525/344
4,321,340  3/1982  Klein .

*Primary Examiner*—C. A. Henderson, Jr.
*Attorney, Agent, or Firm*—Richard E. Nanfeldt

[57] ABSTRACT

This invention relates to amine terminated polyalkylene oxide neutralized sulfonated thermoplastic polymers which have useful physical and rheological properties.

6 Claims, No Drawings

AMINE TERMINATED POLYALKYLENE OXIDE NEUTRALIZED SULFONATED THERMOPLASTIC POLYMERS

FIELD OF THE INVENTION

This invention relates to amine terminated polyalkylene oxide neutralized sulfonated thermoplastic polymers which are useful as adhesives and also posses unusual solubility properties.

BACKGROUND OF THE INVENTION

Recently, a new class of thermoplastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an unneutralized sulfonated elastomeric polymer. The olefinic sites of the elastomeric polymer are sulfonated by means of a complex of a sulfur trioxide donor and a Lewis base. The sulfonated elastomer can be readily neutralized with a basic material to form an ionically cross-linked elastomer having substantially improved physical properties over an unsulfonated elastomer at room temperature. However, these ionically cross-linked elastomers, may be processed like conventional thermoplastics at elevated temperatures under a shear force in the presence of selected preferential plasticizers which dissipate the ionic associations at the elevated temperatures thereby creating a reprocessable elastomer.

The basic materials used as neutralizing agents are selected from simple organic amines, ammonia or basic materials selected from Groups I, II, III, IV, V, VI-B, VII-B and VIII and mixtures thereof of the Periodic Table of Elements. Although these sulfonated elastomeric polymers prepared by the process of this patent are readily usable in a certain number of limited applications, they are not as readily adaptable for the manufacture of an extrudable and injection moldable elastomeric article as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the unneutralized sulfonated elastomeric polymers are organic amines. The resultant ionically cross-linked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonated groups at a temperature of forming.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

U.S. Pat. Nos. 3,974,240 and 3,974,241 issued on Aug. 10, 1976 describe the blending of a crystalline polyolefinic material with a neutralized sulfonated elastomeric polymer in an attempt to improve both rheological and physical properties of the elastomeric polymer. The selection of the use of the crystalline polyolefinic material to improve both the stiffness as well as improving the melt viscosity of the composition was based in part upon the limitation of the use of fillers such as carbon black, clays, calcium carbonate or silicates as a single additive to the elastomeric polymer. Although fillers, in combination with an elastomeric polymer, increase the hardness of the composition, these fillers deteriorate the melt viscosity of the resultant composition.

The aforementioned patents do not envision the neutralization of a sulfonated thermoplastic polymer to form a graft copolymer having unusual physical and rheological properties.

The unique and novel polymers and compositions of the present invention contribute to solution of having a variety of material which in many cases have both favorable rheological and desirable end use properties.

SUMMARY OF THE INVENTION

This invention relates to amine terminated polyalkylene oxide neutralized sulfonated thermoplastic polymers having useful physical and rheological properties.

The amine terminated polyalkylene oxide neutralized sulfonated thermoplastic polymers are formed by the neutralization of a sulfonated thermoplastic polymer with an n-polyalkylene oxide substituted amine.

GENERAL DESCRIPTION OF THE INVENTION

This invention relates to amine terminated polyalkylene oxide neutralized sulfonated thermoplastic polymers having useful physical and rheological properties.

The sulfonated thermoplastic polymers are derived from thermoplastic polymers which have a softening point (glass transition temperature) of between about 25° C. to about 260° C. and more preferably about 25° C. to about 150° C., and most preferably about 35° C. to about 150° C. These thermoplastic polymers have a weight average molecular weight as measured by GPC of about 5,000 to 500,000 and more preferably about 20,000 to about 350,000. The term "thermoplastic" is used in its conventional sense to mean a substantially rigid (flexural modulus > 10,000 psi) material capable of retaining the ability to flow at elevated temperatures for relatively long times.

The thermoplastic polymers can be prepared by a direct addition polymerization process, wherein the chief monomeric component is selected from the group consisting of the following:

Alpha olefins, such as styrene, vinyl toluene, t-butylstyrene, alpha-methyl styrene, chlorostyrene, vinyl cyclohexane, 1,6-heptadiene, and the like; nitrile containing monomers, such as acrylonitrile and methacrylonitrile; and amide containing monomers, such as acrylamide.

The thermoplastic polymers can also be prepared by a condensation process, such as polyesters, polyanhydrides, polyamides, polycarbonates.

Preferably the thermoplastic polymers are polyvinylaromatics, most preferably polystyrene, poly-t-butylstyrene, polyvinyl toluene, and poly-alpha-methyl styrene.

The sulfonate groups can be readily introduced into the aforementioned monomers polymers by one of four means.

A. Copolymerization with Sulfonate-Containing Monomers

Alkali metal salts of styrene sulfonic acid can be copolymerized by using free radical initiations with a plurality of thermoplastic forming monomers such as styrene, acrylamide, methyl, methacrylate, and t-butylstyrene.

B. Direct Sulfonation of Homopolymers and Copolymers

Sulfonic acid groups can be introduced into the homo- or copolymers of vinyl aromatic monomers such as styrene by the direct sulfonation reaction with a sulfonating agent such as an acyl sulfate.

The polystyrene thermoplastics suitable for use in the practice of the invention have a glass transition temperature from about 90° C. to about 150° C., more preferably about 90° C. to about 140° C. and most preferably about 90° C. to about 130° C. These polystyrene resins have a weight average molecular weight of about 5,000 to about 500,000, more preferably about 20,000 to about 350,000 and most preferably about 90,000 to about 300,000. These base polystyrene thermoplastic resins can be prepared directly by any of the known polymerication processes.

The preferred polystyrene thermoplastic resin is a homopolymer of styrene having a number average molecular weight of about 100,000 and an instrinsic viscosity in toluene of about 0.8. These polymers are widely available commercially in large volume. A suitable material is Dow Polystyrene 666 which affords a suitable molecular weight.

The sulfonated polystyrene resins are formed by dissolving the polystyrene resin in a non-reactive solvent such as chlorinated aliphatic solvent, chlorinated aromatic hydrocarbon, an aromatic hydrocarbon, or an aliphatic hydrocarbon, such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the polystyrene polymer and non-reactive solvent at a temperature of about $-100°$ C. to about 100° C. for a period of time of about 1 to about 60 minutes, most preferably at room temperature for about 5 to 45 minutes; and most preferably about 15 to about 30. Typical sulfonating agents are described in U.S. Pat. Nos. 3,642,728 and 3,836,511, incorporated herein by reference. The sulfonating agents are selected from an acyl sulfate, or a mixture of sulfuric acid and an acid anhydride. The most preferred sulfonation agent for this invention is an acyl sulfate selected from the group consisting of benzoyl, acetyl, propionyl and butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polystyrene backbone. The reaction is quenched with an aliphatic alcohol such as methanol, ethanol or isopropanol, with an aromatic hydroxyl compound, such as phenol, and a cycloaliphatic alcohol such as cyclohexanol or with water. The sulfonated polystyrene resin has about 5 to about 300 meq. sulfonate groups per 100 grams of sulfonated polystyrene, more preferably about 10 to about 240; and most preferably about 15 to about 200. The meq. of sulfonate groups per 100 grams of polymer is determined by both titration of the polymeric sulfonic acid and Dietert Sulfur analysis. In the titration of the sulfonated polystyrene polymer, the polymer is dissolved in solvent consisting of 95 parts of toluene and 5 parts of methanol at a concentration level of 50 grams per liter of solvent. The sulfonated polystyrene resin is titrated with ethanolic sodium hydrooxide to an Alizarin-Thymolphthalein end-point.

The sulfonated polystyrene resin is gel free and hydrolytically stable. Gel is measured by stirring a given weight of polymer in a solvent comprised of 95 toluene-5-methanol at a concentration of 5 wt.% for 24 hours, allowing the mixture to settle, withdrawing a weighed sample of the supernatant solution and evaporating to dryness. Hydrolytically stable means that the acid function, in this case the unneutralized sulfonate groups, will not be eliminated under neutral or slightly basic conditions to a neutral moiety which is incapable of being converted to highly ionic functionality.

C. Direct Sulfonation of Modified Polymers

Where desirable homopolymers cannot be directly reacted to produce sulfonate-containing materials, it is possible to introduce by copolymerization functional groups capable of reacting with sulfonating agents. The two most desirable functional groups for this purpose are double bonds and aromatic groups.

1. Copolymers of Aromatic Monomers

Copolymerization of vinyl monomers with styrene or other vinyl aromatics reactive to sulfonating agents produces copolymers capable of being sulfonated. Illustrative examples are chlorostyrene-styrene, styrene-acrylonitrile, styrene-vinyl acetate, etc. In non-vinylic polymer systems, an aromatic group can be introduced into the polymer through the use of an aromatic containing monomer, e.g., phenyl glycidyl ether copolymerized with alkylene oxides. The reagents suitable for the introduction of sulfonic acid groups directly are the same as those useful in the direct sulfonation of homopolymers such as acyl sulfate.

2. Polymers Containing Unsaturation

Although unsaturation may be introduced into homopolymers in a number of ways, copolymerization with a conjugated diolefin generally can be relied on to produce thermoplastic materials containing small amounts of unsaturation. Suitable comonomers for the introduction of unsaturation in vinyl polymers are conjugated diolefins, such as butadiene, isoprene, dimethylbutadiene, piperylene and non-conjugated diolefins, such as allyl styrene. Copolymers can be made by using any of the applicable initiating systems, i.e., free radical, cationic, anionic, or coordinated anionic. In polyethers unsaturation can be introduced by copolymerization with unsaturated epoxides such as allyl glycidyl ether.

The reagents which are suitable for the direct introduction of sulfonic acid groups into unsaturated thermoplastics are complexes of a sulfur trioxide donor with a Lewis base containing oxygen, sulfur, or phosphorous. Typical sulfur trioxide donors are $SO_3$, chlorosulfonic acid, fluorosulfonic acid, sulfuric acid and oleum. Typical Lewis bases are dioxane, tetrahydrofuran, tetrahydrothiophene, trialkyl phosphates such as triethyl phosphate and carboxylic acids. Especially suitable of the trialkyl phosphate complexes are those which have a 1/1 ratio of $SO_3$/trialkyl phosphate. The complexes with carboxylic acids, i.e., the acyl sulfates, are most preferred. These sulfonating agents and the process of sulfonating the polymer are described in U.S. Pat. No. 3,642,728 which is herein incorporated by reference.

D. Oxidation of Sulfur Containing Functional Groups

Polymers which contain sulfonic acid groups can be readily air oxidized to sulfonic acids. Polymers containing mercaptan groups can be easily converted to the sulfonic acid groups through oxidation of the mercaptan groups with a variety of oxidizing agents, such as hydrogen peroxide, potassium permanganate, and sodium dichromate.

The unneutralized sulfonated containing polymers of the instant invention are neutralized with polyalkylene oxides possessing amine end groups. These are also described as n-polyalkylene oxide substituted amines.

The n-polyalkylene oxide substituted amines can be derived from mono-amines or polyamines. The mono-amines can be primary, $R_1$, $R_2$, and $R_3$ groups which can be alkyl, cycloalkyl, aryl, alkaryl, and aralkyl. Examples of these substituents are methyl, ethyl, propyl, butyl, decyl, lauryl, octadecyl, cyclohexyl, phenyl, tolyl, benzyl, and the like. The polyamines have the general formula

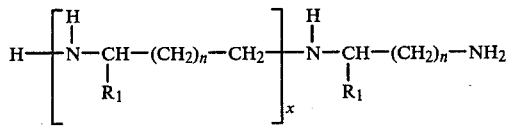

where $n=o$ to about 4, $x=o$ to about 5, and $R_1$ is hydrogen, an alkyl or aryl group. Examples of such polyamines are ethylene diamine, 1,2-propylene diamine, 1,3-propylene diamine, 1,6-hexanendiamine, diethylene triamine, triethylene, tetramine, and the like. The lower alkylene groups are preferred and the ethylene group is most preferred. Of the ethylene derivatives ethylene diamine itself is most preferred.

The amine terminated polyalkylene oxide chains can be homo- or copolymers of alkylene oxides. The copolymers may be random or block, and the nature of the copolymer and its composition determines to a large extent the properties of the neutralized polymer and the applications where such compositions might be useful.

The molecular weights of the amine terminated n-polyalkylene oxides can be from about 600 to about 70,000, preferably about 1000 to about 45,000, most preferably about 1200 to about 30,000.

Useful n-polyalkylene oxide substituted amines are the ethoxylated long chain, fatty acid derived amines such as lauryl amine and stearyl amine

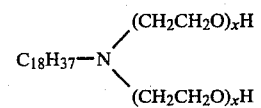

where x and y can be from 5 to 200. Especially useful are ethoxylated stearyl and lauryl amines where $x+y=50$.

Useful n-polyalkylene oxide substituted polyamines are the Tetronic (BASF Wyandotte) polyols derived from ethylene diamine, ethylene oxide, and propylene oxide.

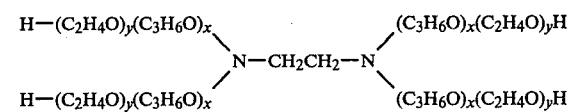

These materials are composed of blocks of propylene oxide and ethylene oxide. They vary in ethylene oxide content (10 to 80 weight %) and in overall molecular weight (1650 to 27,000).

The graft copolymers of this invention possess melt viscosities considerably lower than might be expected simply by an increase in the molecular weight of the base sulfonated thermoplastic polymer. The relatively low molecular weight amines, most especially secondary and tertiary amines, reduce the melt viscosity of sulfonic acid-containing polymers. The high molecular weight branches change the free volume of the graft copolymer system, and this results in a substantial reduction in both melt viscosity and in solution viscosity. These low viscosities then permit the use of higher solution concentrations or the easy processing of the graft copolymers.

The products resulting from the neutralization of sulfonic acid-containing thermoplastics with amine terminated polyalkylene oxides are determined not only by the composition of the thermoplastic backbone, but also (1) the sulfonate content of the polymer, (2) the molecular weight of the amine terminated polyalkylene oxide, and (3) the composition of the final neutralized product, i.e., the relative amounts of thermoplastic polymer and amine terminated polyalkylene oxide. It should be clear that the final composition is a function of both sulfonic acid content and molecular weight of the amine terminated polyalkylene oxide.

The solubility characteristics of the graft copolymers are a function of (1) the solubility characteristics of the main chain and the amine terminated polyalkylene oxide and (2) the relative amounts of these two copolymer segments in the graft copolymer. One aspect of this invention is graft copolymers, wherein the grafts are composed of some or all ethylene oxide units. The solubility of such systems in various organic solvents and in some polar organic solvents, such as alcohols, is good.

It is important to distinguish the products of this invention from conventional neutralized sulfonated thermoplastics. It is now well known that such materials manifest many of the characteristics of cross-linked polymers due to ionic cross-linking. This property is especially pronounced in the case of metal sulfonate moieties. Similarly ammonium neutralized sulfonated polymers exhibit strong ionic association. While this characteristic can be moderated by proper selection of amine structures, the instant invention illustrates how amine terminated polyalkylene oxide neutralized sulfonated polymers can differ in physical properties. As a result the polymers of the instant invention have uses that can be quite different from those of previous sulfonated thermoplastics. The polymers herein described can be useful as hot melt adhesives, or solution coated adhesives. The polymers can be rigid and high softening, or tough semi-elastic, on finally tacky products, dependent on sulfonate level, and amine terminated alkylene oxide composition and molecular weight.

Similarly these products can be useful coatings or melt processable injection moldable plastics, albeit of limited use temperature.

Finally these products possess the characteristic of being soluble in multiple types of solvents ranging from polar (such as dimethylformamide) to non-polar (such as toluene). This solubility behavior is very desirable in selected applications such as viscosifying organic solvents. Under certain circumstances, the polymers of the instant invention can also be employed to create gels of the organic solvents by the addition of moderate levels of water. This property permits the use of these polymers in a number of practical applications.

The sulfonic acid-containing thermoplastics useful for this invention contain from about 5 meq. to about 300 meq. sulfonic acid per 100 g of polymer, preferably from about 10 meq. to about 240 meq., and most preferably from about 15 meq. to about 200 meq.

DETAILED DESCRIPTION

The advantages from the viewpoint of various properties of the polymers of the present invention can be more readily appreciated by reference to the following examples and tables. Unless otherwise specified, all measurements are in parts per hundred by weight.

EXAMPLE 1

Polystyrene (Styron 666) was sulfonated with acetyl sulfate, in 1,2-dichloroethane at 50° C. according to the procedure of U.S. Pat. No. 3,836,511 to obtain polystyrene sulfonic acid containing 41.8 meq. of sulfonic acid/100 g of polymer and possessing a melt index (190° C., 250 psi) of 6.8 g/10 minutes and 0.03 g/minutes (190° C., 43 psi).

Four solutions of 50 grams of the above polystyrene sulfonic acid were prepared in methylene chloride at a concentration of 100 g/liter solvent. To these four solutions were added neat four different ethoxylated amines manufactured by the Armak Company: Ethomeen C-20 an ethoxylated cocoamine with 10 moles of ethylene oxide; Ethomeen 18/12, an ethoxylated stearyl amine with 2 moles of ethylene oxide; Ethomeen 18/25, an ethoxylated stearyl amine with 15 moles of ethylene oxide; and Ethomeen 18/60, an ethoxylated stearyl amine with 50 moles of ethylene oxide. To each solution was added 0.5 g of Antioxidant 2246, and stirring was continued for 60 minutes.

The solutions were evaporated in shallow pans in a fume hood, and the residual polymer sheets were dried further in a vacuum oven at 80°–100° C. The results of these runs are given in Table I. In each case transparent systems were obtained demonstrating that interaction between the ethoxylated amines and sulfonic acid had occurred. Three of the materials were dry and brittle, but the fourth, derived from Ethomeen 18/60 was a relatively tough material.

The melt index data show that even though the overall molecular weight of the graft copolymer increased by as much as a factor of 2; the melt flow increased enormously from the 0.03 g/10 minutes (250 psi) observed for the starting polystyrene sulfonic acid.

TABLE I

| Example | 1-A | 1-B | 1-C | 1-D | 1-E |
|---|---|---|---|---|---|
| Free acid, sulfo-polystyrene, g | 50 | 50 | 50 | 50 | — |
| Total meq. SO₃H | 20.9 | 20.9 | 20.9 | 20.9 | — |
| Meq. SO₃H/100 g polymer | 41.8 | 41.8 | 41.8 | 41.8 | 41.8 |
| Ethomeen | C-20 | 18/12 | 18/25 | 18/60 | — |
| Base amine | Coco | Stearyl | Stearyl | Stearyl | — |
| Moles ethylene oxide/mole | 10 | 2 | 15 | 50 | — |
| Neutralization Equivalent g/mole | 645 | 362 | 905 | 2470 51.6 | — |
| Weight, g | 13.5 | 7.55 | 18.9 | 51.6 | — |
| Mmoles | 20.9 | 20.9 | 20.9 | 20.9 | — |
| g/100 g polymer | 27.0 | 15.1 | 37.8 | 103.2 | — |
| Mmoles/100 g polymer | 41.8 | 41.8 | 41.8 | 41.8 | — |
| Weight % of total | 21 | 13 | 27 | 51 | — |
| Weight % Sulfur | 1.10 | 1.24 | 1.03 | 0.71 | — |
| Moles/100 g polymer | 34.4 | 38.8 | 32.2 | 22.2 | — |
| Weight % Nitrogen | 0.35 | 0.52 | 0.33 | 0.31 | — |
| Moles/100 g polymer | 25.0 | 37.1 | 23.5 | 22.1 | — |
| Nitrogen/sulfur | 0.73 | 0.96 | 0.73 | 1.00 | — |
| Appearance | Transparent, Dry, Brittle | Transparent, Dry, Brittle | Transparent, Dry, Brittle | Transparent, Dry, Tough | Transparent, Dry, Brittle |
| Melt, Index, g/10 minutes | 6.44 — | 0.68 19.3 | 16.3 — | Too Fast — | 0.03 6.8 |

EXAMPLE 2

The four runs in Example 1 were repeated exactly except that instead of using the polystyrene sulfonic acid described in Example 1 unsulfonated polystyrene (Styron 666) was used. In all cases opaque and brittle mixtures were obtained, and in some cases exudation could be observed. These results show that polystyrene-Ethomeen blends are incompatible. Further, these results taken together with the results of Example 1 demonstrate that the properties of the graft copolymers in Example 1 are not simply due to compatible blends of both components, but that an interaction between the amine and the sulfonic acid occurs. The resultant graft copolymer then has properties substantially different from the simple mixture.

EXAMPLE 3

Three stearate polystyrene sulfonic acids were prepared as described in Example 1. They contain 20.5, 27.8, and 62.8 meq. sulfonic acid/100 g polymer. These polymers were dissolved in methylene chloride at a concentration of 100 g/liter solvent and then neutralized with an equimolar portion of Ethomeen 18/60, an ethoxylated stearyl amine with 50 moles of ethylene oxide as described in Example 1. The results of these neutralizations are given in Table II.

These three runs are compared with Example 1-D which also was neutralized with Ethomeen 18/60. In every case transparent products were obtained. They varied from dry and brittle to tough and flexible. Again very large increases in melt index were obtained over those of the base sulfonated polystyrenes. The products in Table V varied in composition from 31 weight % Ethomeen 18/60 to 61 weight % Ethomeen 18/60. This was a direct result of variations in the sulfonic acid contents of the starting sulfonated polystyrenes.

not mixtures of components but true graft copolymers.

TABLE III

| Example | 4-B | 4-D | 1-D | 4-F | 4-C |
|---|---|---|---|---|---|
| Solvent | | | | | |
| 1,2-Dichloroethane | S | S | S | S | S |
| Tetrahydrofuran | S | S | S | S | S |
| Dimethylformamide | S | S | S | S | S |
| Toluene | S | S | S | S | S |
| Isopropanol | I | I | I | I | I |
| Methanol | I | I | I | S | I |
| Acetone | S | S | S | S | I |
| Water | I | I | I | I | I |

S — Soluble
I — Insoluble

TABLE II

| Example | 4-A | 4-B | 4-C | 4-D |
|---|---|---|---|---|
| Free Acid, Sulfo-Polystyrene, g | — | 50.0 | — | 50.0 |
| Total Meq. SO$_3$H | — | 10.25 | — | 13.9 |
| Meq. SO$_3$H/100 g polymer | 20.5 | 20.5 | 27.8 | 27.8 |
| Ethomeen | — | 18/60 | — | 18/60 |
| Base amine | — | Stearyl | — | Stearyl |
| Moles ethylene oxide/mole | — | 50 | — | 50 |
| Neutralization equivalent, g/mole | — | 2470 | — | 2470 |
| Weight, g | — | 25.3 | — | 34.3 |
| Mmoles | — | 10.25 | — | 13.9 |
| g/100 g polymer | — | 50.6 | — | 68.7 |
| Mmoles/100 g polymer | — | 20.5 | — | 27.8 |
| Weight % of total | — | 34 | — | 41 |
| Weight % Sulfur | — | 0.37 | — | 0.49 |
| Moles/100 g polymer | — | 11.6 | — | 15.3 |
| Weight % Nitrogen | — | 0.16 | — | 0.20 |
| Moles/100 g polymer | — | 11.4 | — | 14.3 |
| Nitrogen/sulfur | — | 0.99 | — | 0.93 |
| Appearance | Transparent, Dry, Brittle | Transparent, Tough, Brittle | Transparent, Dry, Brittle | Transparent Tough Flexible |
| Melt Index, g/10 minutes | | | | |
| (190° C., 250 psi) | 13.0 | — | 7.7 | Too Fast |
| (190° C., 43 psi) | 0.34 | 39.9 | 0.16 | Too Fast |

| Example | 1-E | 1-D | 4-E | 4-F |
|---|---|---|---|---|
| Free Acid, Sulfo-Polystyrene, g | — | 50.0 | — | 50.0 |
| Total meq. SO$_3$H | — | 20.9 | — | 31.4 |
| Meq. SO$_3$H/100 g polymer | 41.8 | 41.8 | 62.8 | 62.8 |
| Ethomeen | — | 18/60 | — | 18/60 |
| Base amine | — | Stearyl | — | Stearyl |
| Moles ethylene oxide/mole | — | 50 | — | 50 |
| Neutralization equivalent, g/mole | — | 2470 | — | 2470 |
| Weight, g | — | 51.6 | — | 77.6 |
| Mmoles | — | 20.9 | — | 31.4 |
| g/100 g polymer | — | 103.2 | — | 155.1 |
| Mmoles/100 g polymer | — | 41.8 | — | 62.8 |
| Weight % of total | — | 51 | — | 61 |
| Weight % Sulfur | — | 0.71 | — | 0.82 |
| Moles/100 g polymer | — | 22.2 | — | 25.6 |
| Weight % Nitrogen | — | 0.31 | — | 0.34 |
| Moles/100 g polymer | — | 22.1 | — | 24.3 |
| Nitrogen/sulfur | — | 1.00 | — | 0.95 |
| Appearance | Transparent, Dry, Brittle | Transparent, Dry, Tough | Transparent, Dry, Brittle | Transparent, Dry, Brittle |
| Melt Index, g/10 minutes | | | | |
| (190° C., 250 psi) | 6.8 | Too Fast | — | Too Fast |
| (190° C., 43 psi) | 0.03 | Too Fast | — | Too Fast |

EXAMPLE 4

A polystyrene sulfonic acid and some of the graft copolymers prepared and described in Examples 1 and 3 were tested for solubility in a variety of solvents. The samples were mixed with the various solvents at a concentration of 2 g/40 ml. solvent for up to 24 hours. The results of these solubility tests are given in Table III. It can be seen from the changes in solubility in both acetone and methanol that the graft copolymers are simply

EXAMPLE 5

Styron 666 was sulfonated with acetyl sulfate in 1,2-dichloroethane at 50° C. to obtain a polystyrene sulfonic acid containing 51.3 meq. of sulfonic acid/100 g of polymer and possessing a melt index (190° C., 250 psi) of 5.4 g/10 minutes.

Five separate solutions of the sulfonic acid were prepared in methylene chloride, and the sulfonic acid was neutralized with equimolar portions of five separate Tetronic polyols which all contained 40 weight % ethylene oxide, but which varied in molecular weight.

Tetronic polyols have the following general formula:

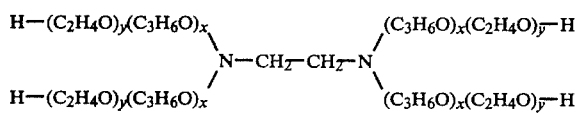

and vary with regard to molecular weight and relative contents of ethylene oxide and propylene oxide. The amount of polystyrene sulfonic acid used was calculated to be that which would provide a total of 100 g of neutralized product. After adding 0.5 g of Antioxidant and stirring for 30 minutes the neutralized products were isolated as described in Example 1. These runs are summarized in Table IV.

The products contained from 46% to 84% Tetronic polyol. As a result products were obtained which varied from soft-but-not-sticky solids to thick and very sticky materials which flowed at room temperature. All products were clear and transparent. Sample 5-A was readily molded into a clear and flexible tensile testing pad and possessed a tensile strength of 750 psi and an elongation of 440%.

These results clearly demonstrate the interaction of the basic Tetronic polyol with polystyrene sulfonic acid to produce graft copolymers with a wide variety of properties. This example further illustrates that different type products can be obtained with the same starting sulfonic acid by changing the molecular weight of the amine terminated polyalkylene oxide.

the direct result of the neutralization reaction between the Tetronic and the sulfonic acid groups on the polystyrene backbone. The result is that graft copolymers are formed through this process of neutralization.

EXAMPLE 7

Four separate polystyrene sulfonic acids were prepared as described in the earlier examples. They contained the following sulfonic acid levels and possessed the following melt indexes.

| Sulfonic Acid, meq./100 g Polymer | Melt Index (190° C., 250 psi), g/10 minutes |
|---|---|
| 15.9 | 11.9 |
| 31.6 | 10.2 |
| 51.3 | 5.5 |
| 63.1 | 3.7 |

These four polystyrene sulfonic acids were dissolved in methylene chloride and neutralized with Tetronic 504 (which contains 40 weight % ethylene oxide and possesses a molecular weight of 3400) as described in Example V. Sufficient polystyrene sulfonic acid was used to result in 100 g of neutralized product. The product was stabilized and isolated as described in Example 5. Results are given in Table V.

The compositions of the products varied from 35% Tetronic 504 to 68% Tetronic 504 because of the changing sulfonic acid contents of the starting polystyrene sulfonic acids. All products were transparent and homogeneous. They varied in properties from a non-sticky solid (tensile strength 1280 psi, elongation 300%) to soft, sticky fluids which flowed on standing at room

TABLE IV

| Example | 5-A | 5-B | 5-C | 5-D | 5-E |
|---|---|---|---|---|---|
| Free Acid, Sulfopolystyrene | | | | | |
| SO3H Content, meq./100 g Polymer | 51.3 | 51.3 | 51.3 | 51.3 | 51.3 |
| Weight, g | 54.2 | 36.4 | 26.2 | 19.0 | 15.7 |
| Milliequivalents | 27.8 | 18.7 | 13.4 | 9.8 | 8.0 |
| Tetronic | 304 | 504 | 704 | 1104 | 1304 |
| Molecular Weight | 1650 | 3400 | 5500 | 8300 | 10,500 |
| Weight % Ethylene Oxide | 40 | 40 | 40 | 40 | 40 |
| Weight, g | 45.8 | 63.6 | 73.8 | 81.0 | 84.3 |
| g/100 g Sulfopolystyrene | 84.6 | 174.4 | 282.2 | 425.8 | 538.7 |
| Weight % of Total | 46 | 64 | 74 | 81 | 84 |
| Total Mmoles | 27.8 | 18.7 | 13.4 | 9.8 | 8.0 |
| Mmoles/100 g Sulfopolystyrene | 51.3 | 51.3 | 51.3 | 51.3 | 51.3 |
| Appearance | Soft Solid, Not Sticky | Soft, Flows, Sticky | Soft, Flows, Sticky | Solid, Very Sticky | Solid, Very Sticky |
| Tensile Strength, psi | 750 | — | — | — | — |
| Elongation, % | 440 | — | — | — | — |

EXAMPLE 6

The preparations of Example 5 were repeated exactly with the exception that unmodified polystyrene (Styron 666) was used instead of a polystyrene sulfonic acid. In each case the resultant mixtures were nonhomogeneous, separating into a solid phase which was opaque and brittle and an oil. This example demonstrates that Tetronics and polystyrene are essentially incompatible. The homogeneous products obtained in Example 5 are temperature. All products possessed very high melt flow especially compared to the starting polystyrene sulfonic acids.

This example demonstrates the use of an amine terminated polyalkylene oxide containing 40 weight % ethylene oxide and further demonstrates that the product composition and properties can be varied solely through variations in the sulfonic acid level of the polystyrene sulfonic acid.

TABLE V

| Example | 7-A | 7-B | 5-B | 7-C |
|---|---|---|---|---|
| Free Acid, Sulfopolystyrene | | | | |
| SO3H Content, meq./100 g Polymer | 15.9 | 31.6 | 51.3 | 63.1 |
| Weight, g | 64.9 | 48.2 | 36.4 | 31.8 |
| Milliequivalents | 10.3 | 15.2 | 18.7 | 20.1 |
| Tetronic | 504 | 504 | 504 | 504 |

TABLE V-continued

| Example | 7-A | 7-B | 5-B | 7-C |
|---|---|---|---|---|
| Molecular Weight | 3400 | 3400 | 3400 | 3400 |
| Weight % Ethylene Oxide | 40 | 40 | 40 | 40 |
| Weight, g | 35.1 | 51.8 | 63.6 | 68.2 |
| g/100 g Sulfopolystyrene | 54.1 | 107.4 | 174.4 | 214.5 |
| Weight % of Total | 35 | 52 | 64 | 68 |
| Total Mmoles | 10.3 | 15.2 | 18.7 | 20.1 |
| Mmoles/100 g Sulfopolystyrene | 15.9 | 31.6 | 51.3 | 63.1 |
| Appearance | Solid, Not Sticky | Soft Solid, Very Sticky | Soft, Flows at Room Temp. | Soft, Flows at Room Temp. |
| Tensile Strength, psi | 1280 | — | — | — |
| Elongation, % | 300 | — | — | — |

EXAMPLE 8

The graft copolymer preparations described in Example 7 were repeated with the exception that a different Tetronic (1104) was used. Tetronic 1104 has a higher molecular weight of 8300, but the same 40 weight % ethylene oxide content as Tetronic 504. Results are given in Table VI.

The products derived from these neutralizations contained from 57 weight % to 84 weight % Tetronic. These results were obtained from the use of polystyrene sulfonic acids varying in sulfonic acid content.

This example demonstrates the preparation of products with very high levels of grafting oligomer and further demonstrates that variations in composition, and therefore product properties, can be obtained either through variation in the sulfonic acid level of the base polymer or the molecular weight of the grafting oligomer or both.

EXAMPLE 9

The graft copolymer preparations described in Example 7 were repeated with the exception that Tetronic 1107 was used for neutralization rather than Tetronic 504. Tetronic 1107 has both a higher molecular weight (14,500) and a higher ethylene oxide content (70 weight) than Tetronic 504. Results are tabulated in Table VII.

All the products were dry, hard, and brittle which reflected both the high ethylene oxide content of the Tetronic and the very high proportion (from 70 weight % to 90 weight %) of Tetronic in the products. All possessed extremely high flow rates (not measurable).

This example demonstrates the use of higher molecular weight amine terminated polyalkylene oxides and the use of higher ethylene oxide copolymers.

TABLE VI

| Example | 8-A | 8-B | 5-D | 8-C |
|---|---|---|---|---|
| Free Acid, Sulfopolystyrene | | | | |
| SO$_3$H Content, meq./100 g Polymer | 15.9 | 31.6 | 51.3 | 63.1 |
| Weight, g | 43.1 | 27.6 | 19.0 | 16.0 |
| Milliequivalents | 6.9 | 8.7 | 9.8 | 10.1 |
| Tetronic | 1104 | 1104 | 1104 | 1104 |
| Molecular Weight | 8300 | 8300 | 8300 | 8300 |
| Weight % Ethylene Oxide | 40 | 40 | 440 | 40 |
| Weight, g | 56.9 | 72.4 | 81.0 | 84.0 |
| g/100 g Sulfopolystyrene | 132.0 | 262.3 | 425.8 | 523.7 |
| Weight % of Total | 57 | 72 | 81 | 84 |
| Total Mmoles | 6.9 | 8.7 | 9.8 | 10.1 |
| Mmoles/100 g Sulfopolystyrene | 15.9 | 31.6 | 51.3 | 63.1 |
| Appearance | Solid, A Little Sticky | Very Soft, Very Sticky | Solid, Very Sticky | Very Soft, Very Sticky |
| Tensile Strength, psi | 230 | 170 | — | — |
| Elongation, % | 720 | 720 | — | — |

TABLE VII

| Example | 9-A | 9-B | 9-C | 9-D |
|---|---|---|---|---|
| Free Acid, Sulfopolystyrene | | | | |
| SO$_3$H Content, meq./100 g Polymer | 15.9 | 31.6 | 51.3 | 63.1 |
| Weight, g | 30.2 | 17.9 | 11.8 | 9.9 |
| Milliequivalents | 4.8 | 5.7 | 6.1 | 6.2 |
| Tetronic | 1107 | 1107 | 1107 | 1107 |
| Molecular Weight | 14,500 | 14,500 | 14,500 | 14,500 |
| Weight % Ethylene Oxide | 70 | 70 | 70 | 70 |
| Weight, g | 69.8 | 82.1 | 88.2 | 90.1 |
| g/100 g Sulfopolystyrene | 230.6 | 458.2 | 743.9 | 915.0 |
| Weight % of Total | 70 | 82 | 88 | 90 |
| Total Mmoles | 4.8 | 5.7 | 6.1 | 6.2 |
| Mmoles/100 g Sulfopolystyrene | 15.9 | 31.6 | 51.3 | 63.1 |
| Appearance | Dry, Hard Brittle | Dry, Hard Brittle | Dry, Hard Brittle | Dry, Hard Brittle |

EXAMPLE 10

Graft copolymers through the neutralization of polystyrene sulfonic acid with Tetronics were prepared from a polystyrene sulfonic acid containing 15.9 meq. sulfonic acid/100 g polymer. High ethylene oxide content Tetronics (70–80 weight %) were used varying in molecular weight from 12,000 to 27,000. Preparations were conducted as described in earlier examples. Results are given in Table VIII.

The products were dry, hard, and brittle in all cases. Melt flow rates were too high to measure. The products varied in composition from 66 weight % to 81 weight % Tetronic.

This example illustrates the use of very high molecular weight amine terminated polyalkylene oxides in combination with a relatively low sulfonic acid level polystyrene sulfonic acid.

TABLE VIII

| Example | 10-A | 9-A | 10-B | 10-C |
| --- | --- | --- | --- | --- |
| Free Acid, Sulfopolystyrene | | | | |
| SO$_3$H Content, meq./100 g Polymer | 15.9 | 15.9 | 15.9 | 15.9 |
| Weight, g | 34.4 | 30.2 | 25.3 | 18.9 |
| Milliequivalents | 5.5 | 4.8 | 4.0 | 3.0 |
| Tetronic | 707 | 1107 | 1307 | 1508 |
| Molecular Weight | 12,000 | 14,500 | 18,600 | 27,000 |
| Weight % Ethylene Oxide | 70 | 70 | 70 | 80 |
| Weight, g | 65.6 | 69.8 | 74.7 | 81.1 |
| g/100 g Sulfopolystyrene | 190.8 | 230.6 | 295.6 | 429.3 |
| Weight % of Total | 66 | 70 | 75 | 81 |
| Total Mmoles | 5.5 | 4.8 | 4.0 | 4.0 |
| Mmoles/100 g Sulfopolystyrene | 15.9 | 15.9 | 15.9 | 15.9 |
| Appearance | Dry, Hard Brittle | Dry, Hard Brittle | Dry, Hard Brittle | Dry, Hard Brittle |

What is claimed is:

1. A neutralized sulfonated thermoplastic polymer comprising a sulfonated thermoplastic polymer having about 5 to about 300 meq. sulfonate groups per 100 grams of said neutralized sulfonated polymer, said sulfonated groups being neutralized with an n-polyalkylene oxide substitute amine, wherein said thermoplastic polymer is derived from a polymer selected from the group consisting of polystyrene, poly-t-butyl styrene, polyvinyl toluene and poly-alpha-methyl styrene.

2. A polymer according to claim 1 wherein said sulfonated polymer is derived from a polymer selected from polystyrene.

3. A polymer according to claim 1 or 2 wherein said n-polyalkylene oxide substituted amine is derived from a monoamine or polyamine.

4. A polymer according to claims 1 or 2 wherein the amine terminated polyalkylene oxide chains can be homo- or copolymers of alkylene.

5. A polymer according to claim 1 or 2 wherein said n-polyalkylene oxide substituted amine is an ethoxylated long chain, fatty acid derived amine.

6. A polymer according to claim 5 wherein fatty acid derived amine is a lauryl amine or stearyl amine.

* * * * *